United States Patent
Tsujita

(10) Patent No.: US 7,126,686 B2
(45) Date of Patent: Oct. 24, 2006

(54) SPECTRAL IMAGE MEASUREMENT APPARATUS AND METHOD USING THE SAME

(75) Inventor: Kazuhiro Tsujita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 241 days.

(21) Appl. No.: 10/920,412

(22) Filed: Aug. 18, 2004

(65) Prior Publication Data

US 2005/0052649 A1 Mar. 10, 2005

(30) Foreign Application Priority Data

Aug. 19, 2003 (JP) ............... P. 2003-295364

(51) Int. Cl.
 G01J 3/28 (2006.01)
 G01J 3/18 (2006.01)
(52) U.S. Cl. ........................... 356/328; 359/573
(58) Field of Classification Search ........ 356/326, 356/328, 334; 359/573
See application file for complete search history.

(56) References Cited

U.S. PATENT DOCUMENTS 5,905,571 A * 5/1999 Butler et al. ............... 356/328
6,853,449 B1 * 2/2005 Hocker ...................... 356/328

FOREIGN PATENT DOCUMENTS

| JP | 1-318929 A | 12/1989 |
| JP | 7-230005 | 8/1995 |
| JP | 10-511772 A | 11/1998 |
| JP | 2001-97710 A | 4/2001 |

* cited by examiner

Primary Examiner—F. L. Evans
(74) Attorney, Agent, or Firm—Sughrue Mion, PLLC

(57) ABSTRACT

A spectral image measurement apparatus comprises: a spectral element array; a spectral element drive section for driving the elements; an inlet-side optical system for guiding a light to the element array; a detection-side optical system for forming an image with a diffracted light output from the element array; and an array sensor for detecting the diffracted light through the detection-side optical system. The element array includes: a substrate; and a plurality of micro-electrically-driven mechanical spectral elements arranged two-dimensionally on the substrate, wherein each of the elements comprises a diffraction grating having a diffraction surface, the diffraction grating being pivotably supported on the substrate; wherein each of the elements generates spectra from a light entering the diffraction surface by applying an electric field to the diffraction grating to tilt the diffraction grating; and wherein each of tilt angles of the diffraction gratings is capable of being set individually.

9 Claims, 12 Drawing Sheets

SPECTRAL IMAGE MEASUREMENT APPARATUS AND METHOD USING THE SAME

BACKGROUND OF THE INVENTION

1. Field of the Invention

The present invention relates to a spectral image measurement apparatus in which a plurality of spectral elements for actuating a microelectrically-driven mechanical diffraction grating are arranged two-dimensionally, as well as to a method using the spectral image measurement apparatus.

2. Description of the Related Art

Light emitted from a substance is highly relevant to motion of electrons in the substance. Since spectra of the light are unique to the substance, the substance can be identified from the spectra.

JP-A-2001-99710 describes a "Method and system for estimating spectra of spectral reflectance" for a multiband image. Under this method, a conversion table has been prepared in advance for each of a plurality of channels of a multiband image consisting of a plurality of original images, wherein brightness values obtained by photographing a chart with known reflectivities are caused to correspond to the reflectivities. Brightness values of the original images of a multiband image obtained by photographing a subject are converted into reflectivities through use of the conversion table, thereby estimating spectra of spectral reflectance of the subject. According to this method, when a multiband image is photographed through use of a wavelength-variable filter and spectra of spectral reflectance of the photographed subject are estimated through use of the multiband image, a processing time required to determine estimated spectra is effectively shortened without involvement of a decrease in the estimation accuracy of spectra.

JP-T-10-511772 describes a "Fabry-Perot Filter Sensor" comprising: a first wafer; a sensor array formed on the first wafer; a ring which is formed on the first wafer and surrounds the sensor array; a second wafer; a first mirror formed on the second wafer; a bridge structure; a second mirror formed on the bridge structure; a Fabry-Perot cavity formed by means of attaching the bridge structure to the second wafer such that the first mirror opposes the second mirror; and an actuator which is formed on the bridge in close proximity to the second wafer and can change a distance between the first and second mirrors so as to tune the Fabry-Perot cavity. The Fabry-Perot Filter Sensor has a sealed, confined structure which is formed by placing the second wafer on a ring and housing an array formed from the Fabry-Perot cavity and the sensor and which enables monolithic microtuning. According to the Fabry-Perot filter sensor, a filtering wavelength is changed by means of controlling a distance between mirrors in the Fabry-Perot cavity.

JP-A-01-318929 describes a "Spectral Imaging Apparatus," wherein the center of a diffraction grating for scattering light (hereinafter called a "light-scattering diffraction grating") and the center of a diffraction grating for mixing light rays (hereinafter called a "light-mixing diffraction grating") are aligned with a single drive axis, and wherein a wavelength is selected by means of rotating the diffraction grating around the drive axis. In this spectral imaging apparatus, the light-scattering diffraction grating and the light-mixing diffraction grating are aligned with each other. Hence, so long as the light-scattering diffraction grating and the light-mixing diffraction grating are set in a single operation so as to achieve optical symmetry by way of an intermediate slit, there is yielded an effect of the diffraction gratings being driven in a one-to-one relationship without causing a displacement or the like.

SUMMARY OF THE INVENTION

An element, such as a liquid-crystal tunable filter, is reported as a wavelength-variable filter described in JP-A-2001-99710. Despite having an advantage of wavelength variation, the element filters the entire image at a single wavelength band. Therefore, the element has a problem of scanning of all wavelength bands being time consuming.

In the Fabry-Perot filter sensor described in JP-T-10-511772, a filtering wavelength is changed by means of controlling the distance in the Fabry-Perot filter. For this reason, it is not easy to control the attitude of the Fabry-Perot cavity of the bridge structure at an intermediate position while maintaining parallelism. As described in the same document, the attitude must be controlled through use of electrodes for use in detecting capacitance. Hence, the Fabry-Perot filter sensor has a complicated structure and becomes bulky. Although the document also provides descriptions about a wavelength being tuned on a per-pixel basis, the principle and structure encounter difficulty in tuning a wavelength.

In the spectral imaging apparatus described in JP-A-01-318929, difficulty, such as an increase in the size and cost of the apparatus, will be encountered if an attempt is made to drive the diffraction gratings with high precision. In addition to this problem, difficulty is also encountered in driving the apparatus at high speed, because the spectral element is large. Even when the spectral imaging apparatus is driven at high speed, there is a drawback of the apparatus being actuated in only a given direction (e.g., a direction from a short wavelength to a long wavelength). The apparatus is bulky, and difficulty is encountered in controlling spectra and a spectral wavelength on a per-pixel basis. For instance, the apparatus encounters difficulty in performing measurement such as pursuit of rapid timewise changes in a plurality of fluorescent light rays having different spectral characteristics.

The present invention has been conceived in view of the foregoing circumstances and its object is to provide a spectral image measuring apparatus in which a spectral element array which enables pixel-basis production of spectra, high-speed operation with a compact, simple structure, and simultaneous observation of a timewise change and a spatial change in spectra, as well as providing a method using the spectral image measuring apparatus.

A spectral element array according to a first aspect of the present invention is intended toward achieving the object, and comprises: a spectral element array which includes a substrate and a plurality of micro-electrically-driven mechanical spectral elements arranged two-dimensionally on the substrate, wherein each of the spectral elements comprises a diffraction grating having a diffraction surface, the diffraction grating being pivotably supported on the substrate, wherein each of the spectral elements generates spectra from a light entering the diffraction surface by applying an electric field to the diffraction grating to tilt the diffraction grating with respect to the substrate, and wherein each of tilt angles of the diffraction gratings with respect to the substrate is capable of being set individually; a spectral element drive section for driving the spectral elements; an inlet-side optical system for guiding, to the spectral element array, a light emitted from an object to be detected; a detection-side optical system for forming an image with a diffracted light output from the spectral element array; and an array sensor for detecting the diffracted light through the detection-side optical system.

In this spectral element array, a plurality of micro-electrically-driven mechanical spectral elements are provided two-dimensionally, and the spectral element is provided with a diffraction grating which is tilted at an arbitrary angle to produce spectra from incident light. As a result of tilt angles of the respective diffraction gratings being changed, a wavelength to be diffracted can be controlled. As a result of each of the spectral elements corresponding to one pixel, production of spectra and control of a spectral wavelength can be performed on a per-pixel basis. As a result, simultaneous observation of timewise and spatial changes in spectra becomes possible. Since the spectral element is constituted of a micro-electrically-driven mechanical spectral element, high-speed operation can be realized by means of a compact, simple structure, and a rapid timewise change can also be detected. As a result, measurement operation, such as pursuit of rapid timewise changes in a plurality of different spectral wavelengths (fluorescence), can also become feasible.

Further, in the aforementioned spectral image measurement apparatus, the light reflected from the object to be detected is guided to the spectral element array by means of an inlet-side optical system. Diffracted light—which has been selected by the spectral element array in accordance with a wavelength and has low light intensity—is gathered by the detection-side optical system and then detected by the array sensor. As a result, timewise and spatial changes in the spectra (wavelength distribution) becomes observable for the array sensor.

According to a second aspect of the present invention, there is provided the spectral image measurement apparatus, wherein each of the spectral elements comprises: a movable electrode that drives the diffraction grating so as to tilt the diffraction grating with respect to the substrate; at least one fixed electrode having a plurality of electrode layers, wherein said at least one fixed electrode is provided beside the diffraction grating, and each of the plurality of electrode layers is confronted with the movable electrode in accordance with each of the set tilt angles.

In this spectral element array, when a voltage is applied between a movable electrode integrated with the diffraction grating and a predetermined fixed electrode stacked beside the diffraction grating, electric charges are electrostatically induced, whereby the diffraction grating is set to a predetermined tilt angle corresponding to the fixed electrode by means of electrostatic force acting between the electric charges and the fixed electrode. Accordingly, a desired fixed electrode is applied to a desired fixed electrode, thereby enabling selective control of a wavelength to be diffracted.

According to a third aspect of the present invention, there is provided the spectral image measurement apparatus, wherein the spectral element array further comprises: an aperture member having at least one opening, wherein each of said at least one opening limits an angle at which an incident light enters the diffraction grating and an angle at which a diffracted light exits the diffraction grating, the aperture member being provided above the diffraction surface of the diffraction grating.

In this spectral element array, the angle at which light enters the respective spectral elements and diffracted light exits from the respective spectral element is fixed by an opening of the aperture member, and a wavelength can be scanned by means of rotating the diffraction grating (i.e., changing the tilt angle of the diffraction grating).

According to a fourth aspect of the present invention, there is provided the spectral image measurement apparatus, further comprising a diaphragm provided at a focal point of a light path of the detection-side optical system.

In this spectral image measurement apparatus, the diaphragm of the detection-side optical system cuts some light of unwanted orders among the diffracted light obtained as a result of the wavelength of the spectral element array being scanned (diffracted light of some wavelength widths is selected), thereby enhancing the accuracy of an image detected by the array sensor.

According to a fifth aspect of the present invention, there is provided the spectral image measurement apparatus, wherein the detection-side optical system includes a microlens array mounted ahead of an optical path of the spectral element array.

In this spectral image measurement apparatus, diffracted light which has been selected by the spectral element array in accordance with a wavelength and has low light intensity is gathered by means of a microlens array and detected by the array sensor.

According to a sixth aspect of the present invention, there is provided a spectral image measurement method using the spectral image measurement apparatus as set forth in any of the fourth to sixth aspects of the invention, the method comprising: setting the tilt angles of respective spectral elements of the spectral element array to different angles in accordance with a desired spectral range; and detecting an intensity of the diffracted light output from the spectral element array with the array sensor in a single operation.

According to this spectral image measurement method, the tilt angles of the respective spectral elements are set to different tilt angles corresponding to a desired spectral range. The intensity of diffracted light output from the spectral element array is detected by the array sensor in a single operation. As a result, so long as diffracted light is obtained from the spectral elements having specific tilt angles, the wavelength of resultant diffracted light is determined from the tilt angles of the spectral elements. The peak wavelength of the diffracted light intensity distribution is detected instantaneously.

According to a seventh aspect of the present invention, there is provided a spectral image measurement method using the spectral image measurement apparatus as set forth in any of the fourth to sixth aspects of the invention, the method comprising: setting the tilt angles of the diffraction gratings of the spectral element array to a first set of tilt angles that correspond to a first wavelength range, and detecting an intensity of a diffracted light output from the spectral element array, so as to obtain a first spectrum of the intensity of the diffracted light and detect a peak of the first spectrum; setting the tilt angles of the diffraction gratings of the spectral element array to a second set of tilt angles that correspond to a second wavelength range, wherein the second wavelength range is narrower than the first wavelength range and is a neighborhood of a wavelength of the detected peak of the first spectrum; and detecting an intensity of a diffracted light in only the second wavelength range.

Under the spectral image measurement method, after detection of a peak in the diffracted light intensity distribution, the diffraction gratings are set at tilt angles in a narrower range corresponding to the neighborhood of the detected peak wavelength, thereby detecting the intensity of the diffracted light. As a result, a detailed spectrum distribution of a peak wavelength band is efficiently obtained, thereby enabling rapid identification of a substance of the object to be detected.

According to an eighth aspect of the present invention, there is provided a spectral image measurement method using the spectral image measurement apparatus as set forth in any of the fourth to sixth aspects of the invention, the method comprising: setting the tilt angles of the diffraction gratings of the spectral element array to a first set of tilt angles that corresponds to a first wavelength range; detecting an intensity of a first diffracted light at one time based on the first set of tilt angles by the array sensor; setting the tilt angles of the diffraction gratings of the spectral element array to a second set of tilt angles that corresponds to a second wavelength range, the second wavelength range being different from the first wavelength range; and detecting an intensity of a second diffracted light at one time based on the second set of tilt angles by the array sensor.

Under the spectral image measurement method, diffraction gratings of the respective spectral elements in the spectral element array are sequentially, repeatedly set at tilt angles corresponding to a plurality of different wavelengths, whereby each of specific spectral intensities of different wavelength ranges is detected at one time. As a result, measurement, such as pursuit of rapid timewise changes in a plurality of different spectral wavelengths (fluorescence), becomes feasible.

According to a ninth aspect of the present invention, there is provided a spectral image measurement method using the spectral image measurement apparatus as set forth in any of the fourth to sixth aspects of the invention, the method comprising: setting all of the tilt angles of the diffraction gratings of the spectral element array to a specific single tilt angle; and detecting a spatial intensity distribution corresponding to a specific wavelength.

Under the spectral image measurement method, diffraction gratings of all spectral elements are synchronously set to a single tilt angle. Diffracted light corresponding to the tilt angle is obtained from a plurality of two-dimensionally arranged arbitrary diffraction gratings. As a result, a spatial distribution of the substance identified by the diffracted light can be detected.

DETAILED DESCRIPTION OF THE INVENTION

A preferred embodiment of a spectral image measurement apparatus and method using the spectral image measurement apparatus of the present invention, all pertaining to the present invention, will be described in detail hereinbelow by reference to the drawings.

Figure 1:
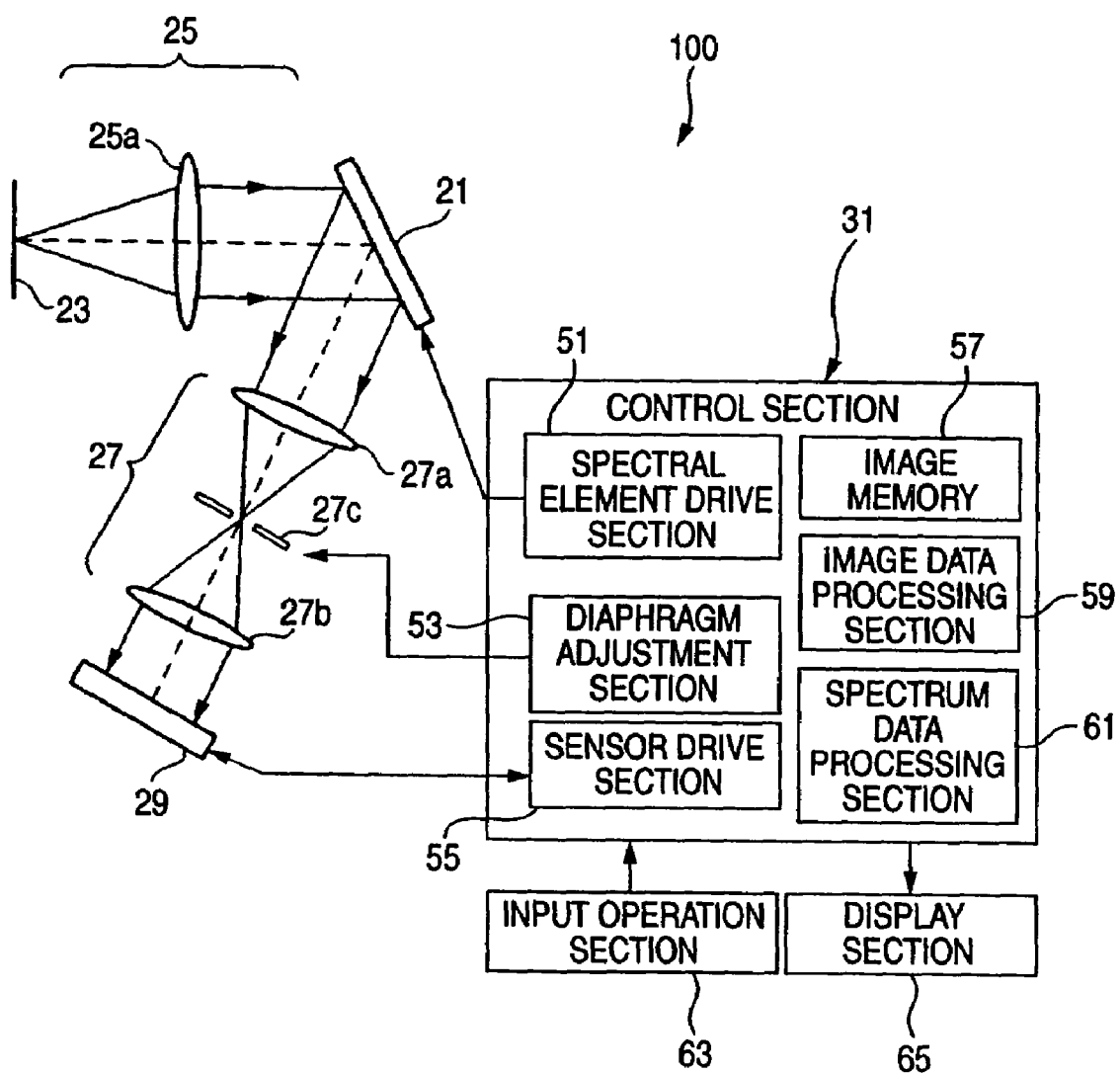
FIG. 1 is a block diagram showing a first embodiment of a spectral image measurement apparatus according to the present invention.
Figure 2:
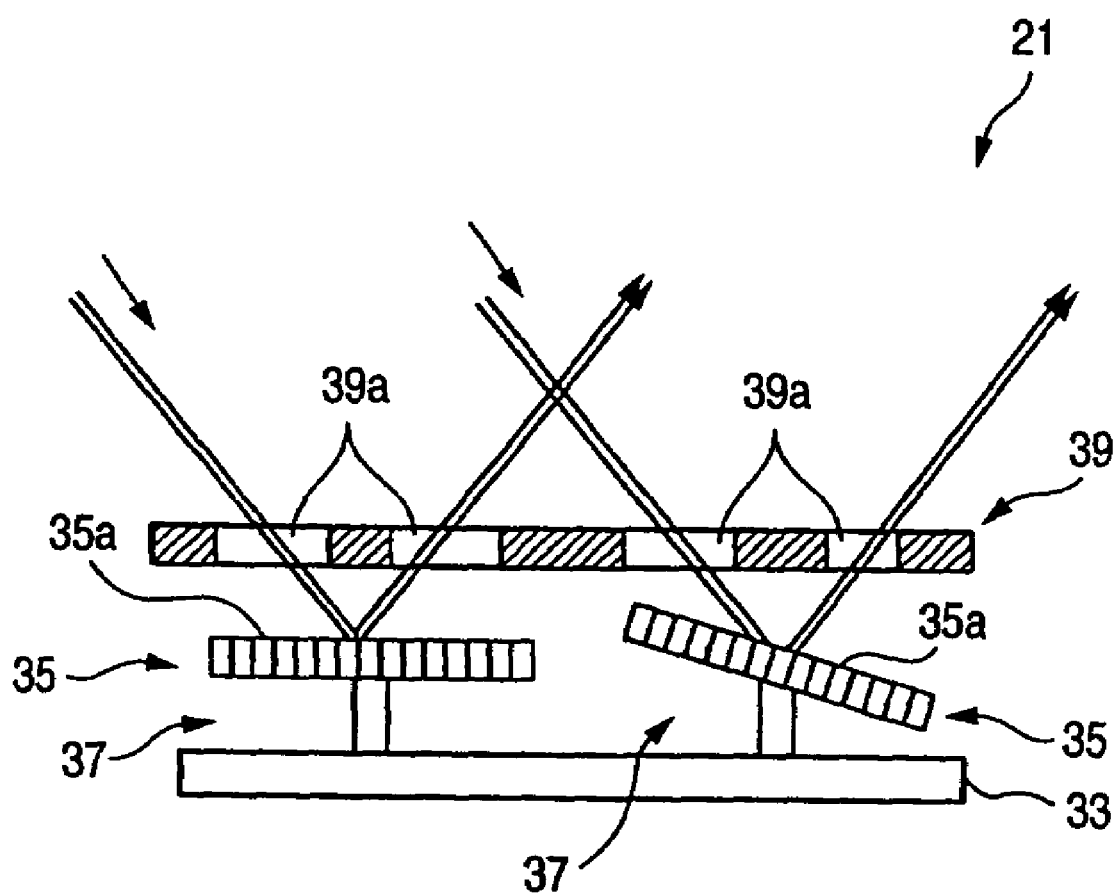
FIG. 2 is an enlarged view of the principal section of the spectral element array shown in FIG. 1.
Figure 3:
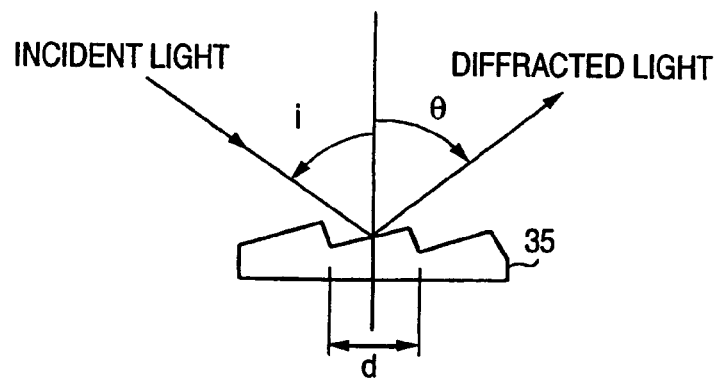
FIG. 3 is an enlarged view of the spectral element.
Figure 4:
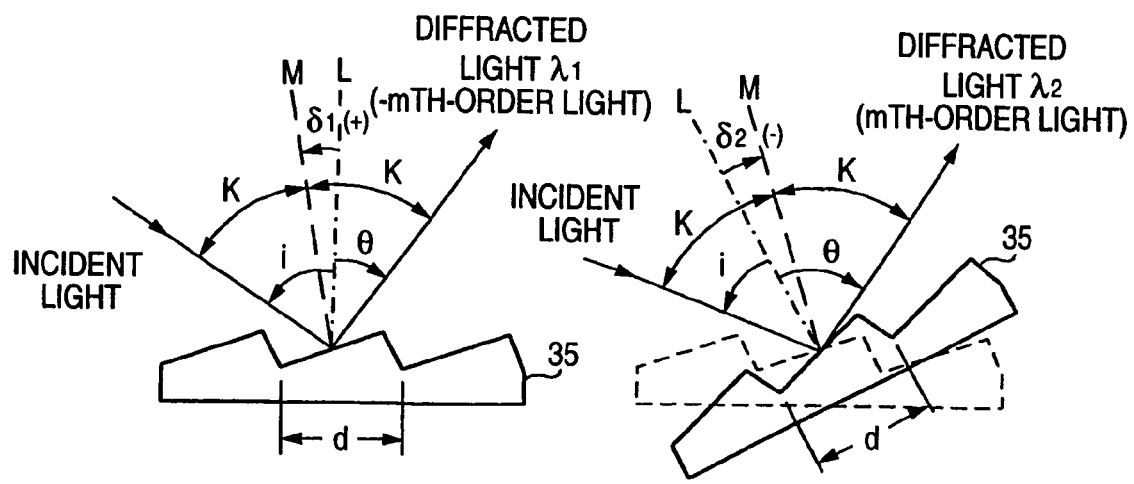
FIG. 4 is a descriptive view for describing the principle of the spectral element.
Figure 5:
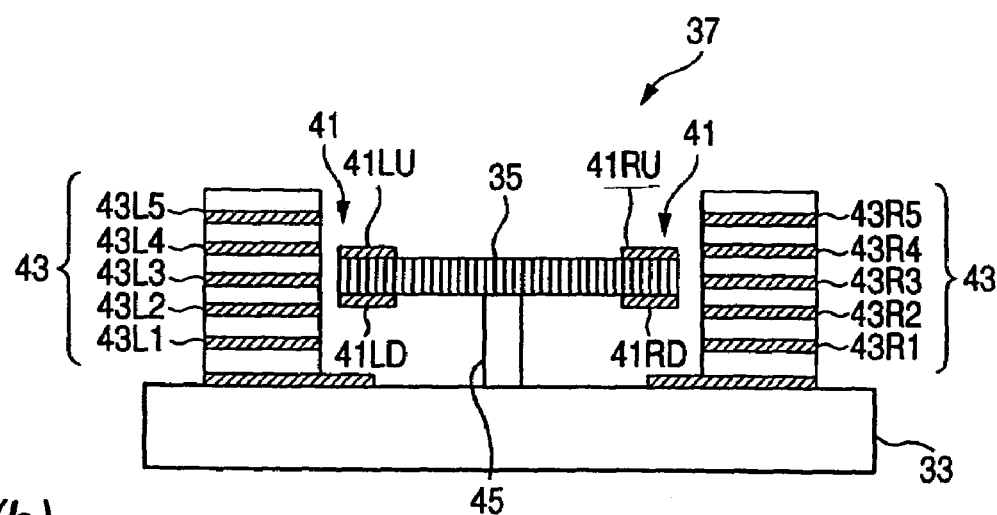
FIG. 5 is a descriptive view for describing operation of the spectral element.
Figure 5:
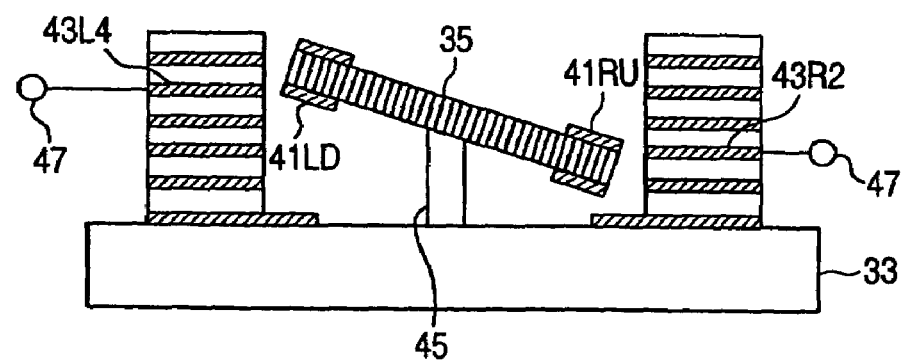
Figure 6:
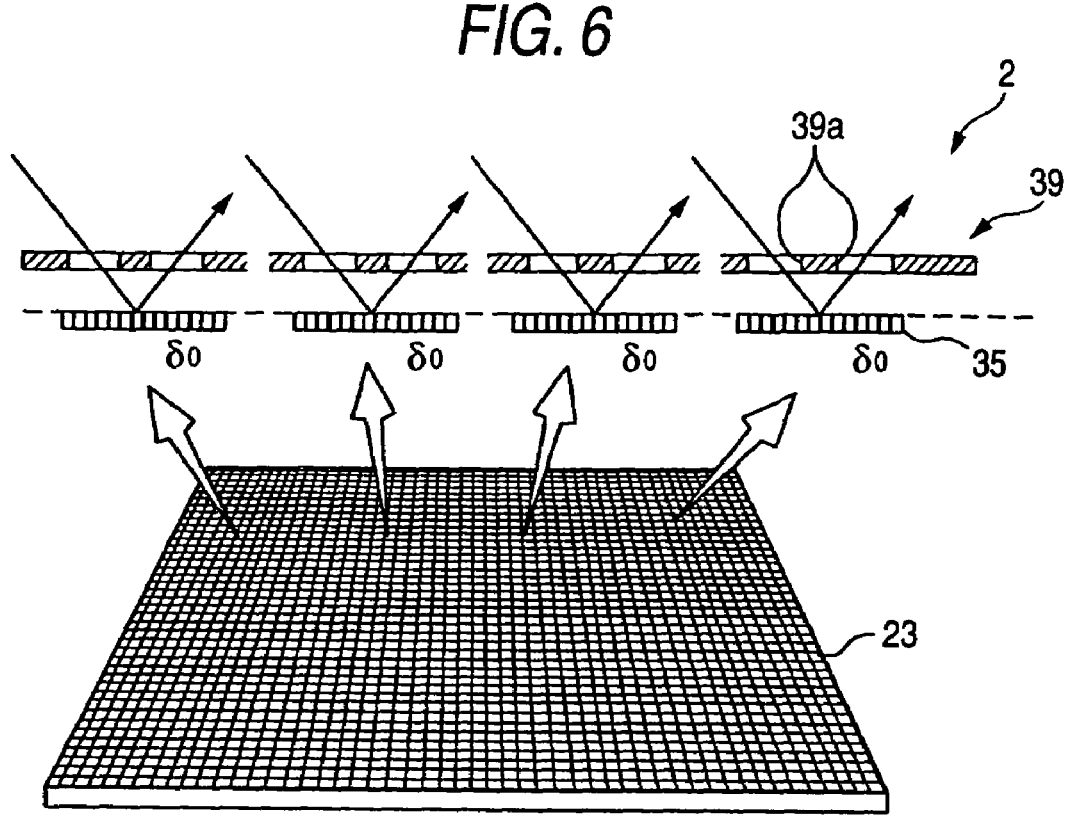
FIG. 6 is a descriptive view for describing operation of the spectral element array which detects diffracted light by means of tilting diffraction gratings to a single tilt angle.
Figure 7:
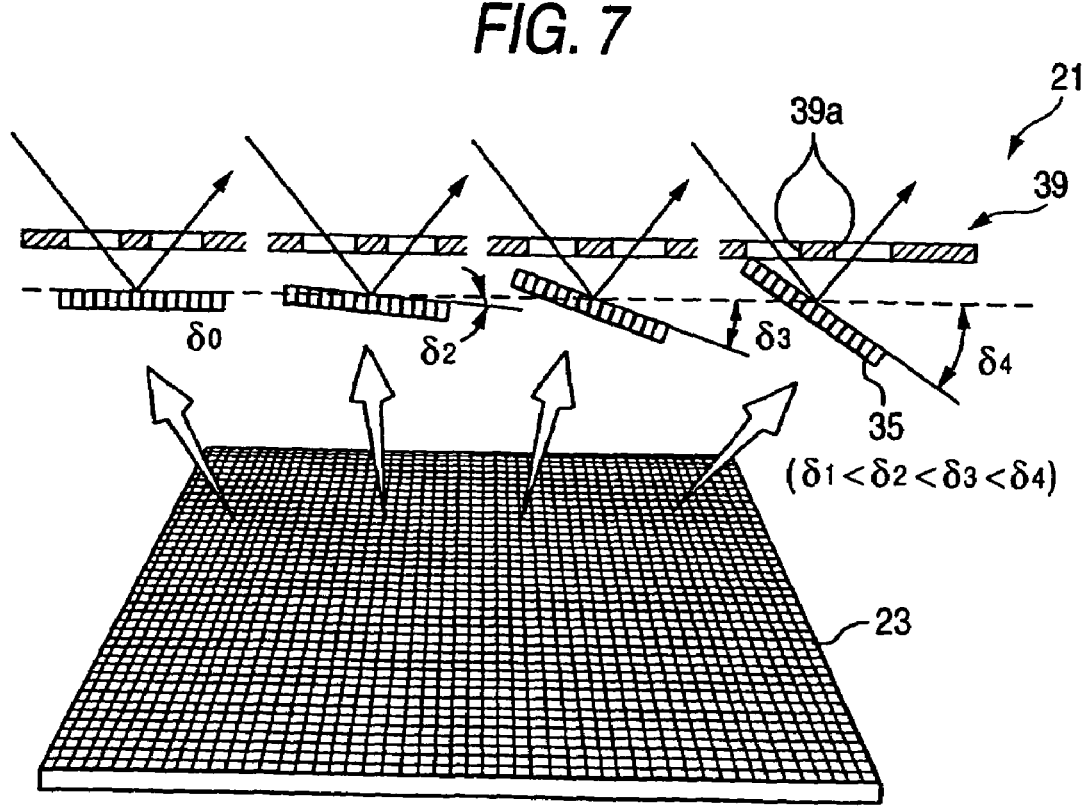
FIG. 7 is a descriptive view for describing the spectral element array for detecting diffracted light by means of controlling the diffraction gratings to different tilt angles.
Figure 8:
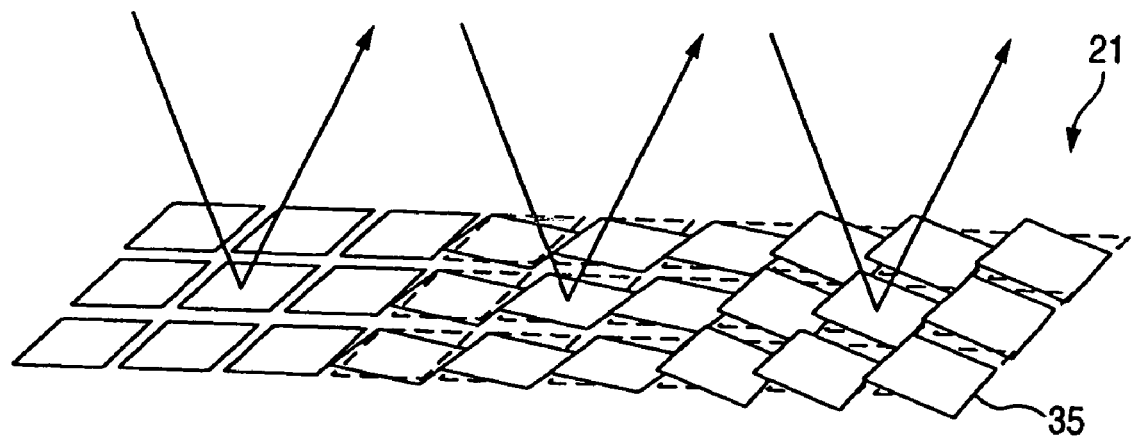
FIG. 8 is a perspective view of the diffraction gratings shown in FIG. 7.

FIG. 1 is a block diagram showing a first embodiment of a spectral image measurement apparatus according to the present invention; FIG. 2 is an enlarged view of the principal section of the spectral element array shown in FIG. 1; FIG. 3 is an enlarged view of the spectral element; FIG. 4 is a descriptive view for describing the principle of the spectral element; FIG. 5 is a descriptive view for describing operation of the spectral element; FIG. 6 is a descriptive view for describing operation of the spectral element array which detects diffracted light by means of tilting diffraction gratings to a single tilt angle; FIG. 7 is a descriptive view for describing the spectral element array for detecting diffracted light by means of controlling the diffraction gratings to different tilt angles; and FIG. 8 is a perspective view of the diffraction gratings shown in FIG. 7.

As shown in FIG. 1, a spectral image measurement apparatus 100 of the present embodiment comprises, as principal constituent elements: a spectral element array 21; a guide-side optical system 25 for guiding light reflected from an object of detection 23 (hereinafter simply called an "object") to the spectral element array 21; a detection-side optical system 27 for forming an image from diffracted light output from the spectral element array 21; an array sensor 29 for detecting diffracted light by way of the detection-side optical system 27; and a control section 31 for driving and controlling the spectral element array 21, the detection-side optical system 27, and the array sensor (image sensor) 29. Both the guide-side optical system 25 and the detection-side optical system 27 are constituted of a telecentric optical system.

The guide-side optical system 25 has an objective lens 25a. The detection-side optical system 27 has a relay lens 27a, an image lens 27b, and a diaphragm 27c sandwiched therebetween.

As shown in FIG. 2, the spectral element array 21 is constituted of a plurality of two-dimensionally arranged spectral elements 37 of a micro electromechanical system (MEMS) which tilt diffraction gratings 35 pivotably supported on a substrate 33 by means of application of an electric field, thereby generating spectra from light entering diffraction surfaces 35a of the diffraction gratings 35. In the spectral element array 21, tilt angles of the respective diffraction gratings 35 of the spectral elements 37 can be set individually by means of electrostatic force generated by application of an electric field between a movable electrode and a fixed electrode, which will be described later. Here, MEMS is an abbreviation for Micro Electro Mechanical Systems, and is an element technique for electrically displacing/moving a micro-structure having a size on the order of micrometers. A typical manufacturing method of this technique is a micromachining technique used in a semiconductor process technique.

Aperture member 39 are provided at positions above the respective diffraction surfaces 35a of the diffraction gratings 35 so as to oppose the diffraction surfaces 35a. Openings 39a are formed in aperture member 39 for regulating an angle at which incident light and diffracted light enter or exit the diffraction grating 35. The angle at which the incident light enters the spectral element 37 and the angle at which the diffracted light exits from the respective spectral elements are fixed by means of the openings 39a of the aperture member 39, and a wavelength can be scanned by means of rotating the diffraction gratings 35 (changing the tilt angles of the diffraction gratings 35).

In the present embodiment, the diffraction gratings 35 employed in the spectral element 37 are of reflection type.

The operation principle of the spectral element 37 will now be described by reference to FIGS. 3 and 4.

As shown in FIG. 3, light having a wavelength λ enters, at an incident angle "i," the diffraction grating 35 having a trench interval (i.e., a lattice constant). The following relational expression (1) stands on the assumption that a diffraction angle of the diffraction grating is taken as θ.

$$m\lambda = d \bullet (\sin i \pm \sin \theta) \quad (1)$$

where "m" denotes the order of diffracted light.

The manner of imparting symbols "m," "i," and θ changes according to a system to be handled. The symbols are imparted as follows. The order "m" becomes a positive order (m>0, also called an inside order) when the diffracted light is on the same side as the incident light with reference to the direction P of $0^{th}$-order diffracted light (an incident angle "i"=a diffraction angle θ achieved at this time). When the diffracted light is on the side opposite the incident light with reference to the direction P of $0^{th}$-order diffracted light, the order "m" becomes a negative order (m<0, also called an outside order).

Symbol "i" is always made positive. When the diffracted light is on the same side as the incident light with reference to a normal L of the diffraction surface 35a, θ<0 is obtained. When the diffracted light is on the side opposite the incident light with reference to the normal L, θ>0 is obtained.

In a diffraction grating which is widely used in a visible UV range, the number of trenches per unit length (i.e., an inverse number of "d") is 60 to 1600/mm or thereabouts.

As shown in FIG. 4, in a spectral element which extracts common monochrome light, an angle (taken as 2K=θ+i) formed between the incident light and the diffracted light is constant, and a wavelength is scanned by means of rotating the diffraction grating 35. Therefore, a relationship between the wavelength and the rotational angle of the diffraction grating 35 becomes easily understandable by means of transforming Equation 1 into Equation 2 provided below.

$$\lambda = -\left(\frac{2d}{m}\right) \bullet \cos K \bullet \sin \delta \text{ then, } \delta = \frac{i-\theta}{2} \quad (2)$$

(Here, when δ is positive, the order "m" becomes negative. In contrast, when δ is negative, the order "m" becomes positive.)

Now, δ depicts an angle formed between the incident light and the diffracted light. When the normal L is on the same side as the incident light with reference to a bisector M, δ becomes positive. When the normal L is on the same side as the diffracted light with reference to the bisector M, δ becomes negative. The sign of "m" becomes different from the previously-described definition and always assumes a sign opposite that of δ.

As shown in FIG. 5A, the spectral element 37 comprises a movable electrode 41 for tilting the diffraction grating 35; and a plurality of layers of fixed electrodes 43 which oppose the movable electrode 41 are stacked in layers beside the diffraction grating 35 and oppose the movable electrode 41 in accordance with respective set tilt angles. The diffraction grating 35 is coupled to a support shaft 45 provided upright on the substrate 33 or an upper edge of the support wall by way of a flexible hinge. The movable electrode 41 comprises a movable electrode 41RU which constitutes a right-end upper surface; a movable electrode 41RD which constitutes a right-end lower surface; a movable electrode 41LU which constitutes a left-end upper surface; and a movable electrode 41LD which constitutes a left-end lower surface. The fixed electrode 43 comprises fixed electrodes 43R1, 43R2, 43R3, 43R4, and 43R5, which are stacked on the right side of the substrate 33; and fixed electrodes 43L1, 43L2, 43L3, 43L4, and 43L5, which are stacked on the left side of the substrate 33. The above-described number of layers to be stacked is an example, and the number of layers to be stacked is not limited to this number.

The spectral element 37 pivotally actuates, as a basic operation thereof, the diffraction grating 35 by means of applying a voltage to the movable electrode 41 and the fixed electrode 43, thereby scanning the wavelength of the diffracted light.

Specifically, when a potential difference is generated between a predetermined electrode among the electrodes 41RU, 41RD, 41LU, and 41LD of the movable electrode 41 and a predetermined electrode among the electrodes 43R1, 43R2, 43R3, 43R4, 43R5, 43L1, 43L2, 43L3, 43L4, and 43L5 (hereinafter may be called a predetermined "member electrode") of the fixed electrode 43, electrostatic force develops between the movable electrode 41 and the fixed electrode 43, and torque acts on the diffraction grating 35 with the hinge serving as the torsion center. Accordingly, the diffraction grating 35 can be rotationally displaced from side to side by means of controlling the potential of the movable electrode 41 and that of the fixed electrode 43.

For instance, as shown in FIG. 5B, a potential is applied to a drive electrode 47 which connects together the right-side fixed electrode 43R2 and the left-side fixed electrode 43L4, over the substrate 33. Further, a potential is applied to the upper right movable electrode 41RU and the lower left movable electrode 41LD. This potential is supplied and controlled by means of an unillustrated semiconductor integrated circuit (e.g. a CMOS circuit or the like) formed on the substrate 33.

As mentioned above, as a result of a potential being supplied to an arbitrary member electrode of the movable electrode 41 and an arbitrary member electrode of the fixed electrode 43, as required, the diffraction grating 35 can be rotated leftward or rightward or displaced to an arbitrary position, such as a flat position, by means of an electrostatic force developing across the arbitrary electrodes and elastic force of the hinge, thereby enabling selective control of a wavelength to be diffracted.

The driving method adopted this time may be either analog control (e.g., control for realizing arbitrary displacement) or digital control (e.g., control for realizing a binary displacement). The method for displacing the diffraction grating 35 is illustrative, and the displacement method of the invention is not limited to this illustrative method.

In the spectral image measurement apparatus 100, the diaphragm 27c is provided at the position of the focal point of the detection-side optical system 27. The detection-side optical system 27 is provided with the diaphragm 27c, to thus constitute a telecentric optical system. The telecentric optical system cuts light of undesired orders from among the diffracted light rays obtained as a result of the wavelength being scanned by the spectral element array 21 (i.e., selects diffracted light of several wavelength widths). Specifically, when a lens is placed, a light ray entering the lens in parallel with the optical axis of the lens passes through the focal point without fail. However, a light ray having entered the lens obliquely with reference to the optical axis does not pass through the focal point. At this time, if the diaphragm 27c is placed at the focal point of the lens, light rays other than a collimated light ray can be cut, thereby enabling extraction of only the collimated light ray. As a result, the resolution of a wavelength detected by the array sensor 29 is enhanced.

The control section 31 comprises a spectral element drive section 51 for tilting the diffraction grating 35 of the spectral element 37 at a predetermined angle switching timing; a diaphragm adjustment section 53 for adjusting the aperture member of the diaphragm 27c; a sensor drive section 55 for controlling a timing at which the array sensor 29 performs reading operation or the like; image memory 57 for storing image information read by the array sensor 29; an image data processing section 59 for processing the image information stored in the image memory 57; and a spectrum data processing section 61 for acquiring spectrum data from the image data processed by the image data processing section 59. The control section 31 is connected to an input operation section 63 for selecting a mode (e.g., the range of a wavelength to be scanned, a scan step, a time step, a wavelength step, and a band width) or the like and to a display section 65 for indicating a spectrum distribution.

In the spectral image measurement apparatus 100, driving of the spectral element array 21 and the array sensor 29 is controlled by the control section 31. Therefore, measurement of a spectral image in different modes becomes feasible. For instance, as shown in FIG. 6, measurement of a spectral image can be performed in a mode for detecting a spatial intensity distribution in which all the diffraction gratings 35 of the spectral element array 21 are set to a single specific tilt angle. Alternatively, as shown in FIG. 7, measurement of a spectral image can also be performed in a mode for simultaneously detecting diffracted light rays of different wavelengths obtained as a result of tilt angles of the respective spectral elements 37 of the spectral element array 21 having been set to different angles within a desired spectral range. Moreover, as shown in FIG. 8, in order to acquire higher intensity of the diffracted light, a plurality of spectral elements (nine spectral elements are shown by way of an example in the drawing) may be merged into a group, and the tilt angles of the diffraction gratings 35 may be made identical with each other, whereby a diffraction line for a specific tilt angle may be obtained from a plurality of spectral elements. The method for measuring a spectral image in these modes will be described later.

Therefore, according to the spectral element array 21, a plurality of the micro-electrically-driven mechanical spectral elements 37 are provided two-dimensionally. The spectral element 37 is provided with the diffraction grating 35 which is tilted at an arbitrary angle to produce spectra from incident light. The tilt angles of the respective diffraction gratings 35 are changed, whereby a wavelength to be diffracted can be controlled. As a result of each of the spectral elements 37 corresponding to a single pixel, production of spectra and control of a spectral wavelength can be performed on a per-pixel basis. As a result, simultaneous observation of timewise and spatial changes in spectra becomes possible. Since the spectral element 37 is constituted of a micro-electrically-driven mechanical spectral element, high-speed operation can be realized by means of a compact, simple structure, and a rapid timewise change can also be detected. As a result, measurement operation, such as pursuit of rapid timewise changes in a plurality of different spectral wavelengths (fluorescence), also becomes feasible.

According to the spectral image measurement apparatus 100, the light reflected form the object 23 is guided to the spectral element array 21 by means of the inlet-side optical system 25. Diffracted light—which has been selected by the spectral element array 21 in accordance with a wavelength and has low light intensity—is gathered by the detection-side optical system 27 and then detected by the array sensor 29. As a result, the array sensor 29 can observe timewise and spatial changes in the spectra (wavelength distribution).

A second embodiment of the spectral image measurement apparatus according to the present invention will now be described.

Figure 9:
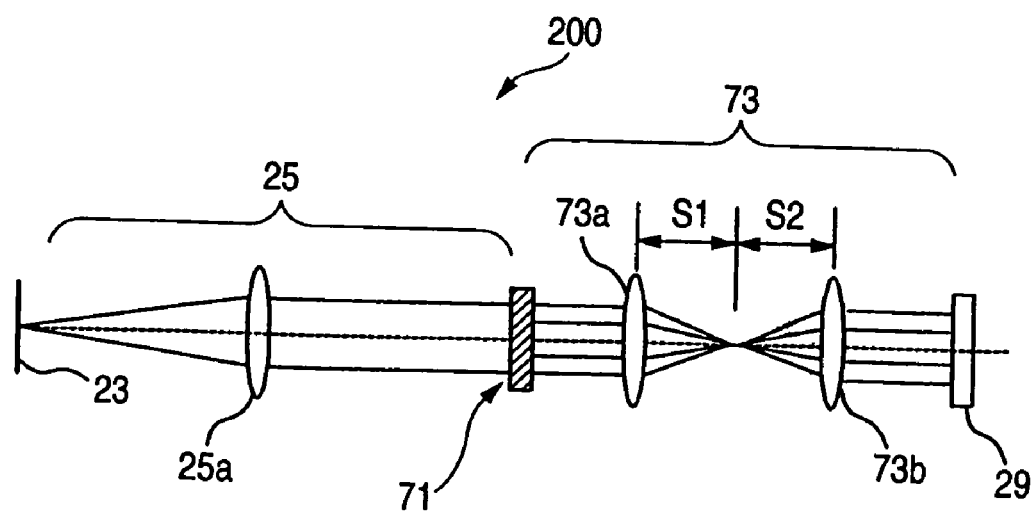
FIG. 9 is a block diagram showing a second embodiment of the spectral image measurement apparatus according to the invention.
Figure 10:
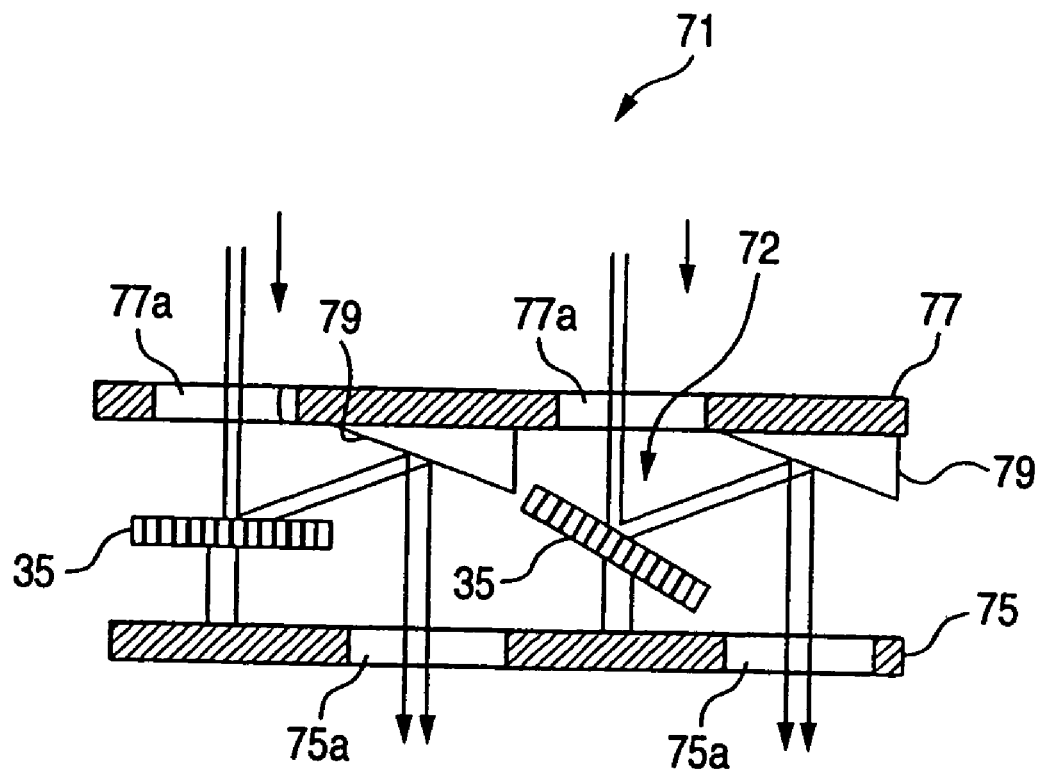
FIG. 10 shows an enlarged view of the principal section of the spectral element array shown in FIG. 9.

FIG. 9 is a block diagram showing a second embodiment of the spectral image measurement apparatus according to the invention, and FIG. 10 shows an enlarged view of the principal section of the spectral element array shown in FIG. 9. Those elements which are the same as those shown in FIGS. 1 through 8 are assigned the same reference numerals, and repeated explanations thereof are omitted.

A spectral image measurement apparatus 200 of the present embodiment is identical in basic configuration with the spectral image measurement apparatus 100, exclusive of a spectral element array 71. Specifically, the light reflected from the object 23 is guided to the spectral element array 71 by way of the inlet-side optical system 25, and diffracted light output from the spectral element array 71 is read by the array sensor 29 by means of a detection-side optical system 73. The detection-side optical system 73 is provided with relay lenses 73a, 73b, in this sequence from the spectral element array 71. The relay lens 73b forms an image on the array sensor 29 from the diffracted light output from the spectral element array 71 at a magnification factor S2/S1.

Spectral elements 72 of the spectral element array 71 have diffraction gratings of Raman-Nath type and constitute elements of pseudo-transmission type, as shown in FIG. 10.

The diffraction gratings 35 are supported on a substrate 75, which doubles as an aperture member, by way of the hinge in the same manner as mentioned previously. An aperture member 77 is positioned above the diffraction gratings in parallel with the substrate 75. Openings 75a through which the diffracted light passes are drilled in the substrate 75, and openings 77a for letting incident light enter are formed in the aperture member 77. The openings 75a, 77a operate in the same manner as do the openings 39a. Mirrors 79 are disposed on a lower surface of the aperture member 77 such that the mirrors 79 and the openings 77a are arranged alternately. The mirrors 79 operate so as to cause the diffracted light from the diffraction grating 35 to exit toward the openings 75a.

Accordingly, in the spectral element array 71, the incident light and the diffracted light exiting from the spectral elements 72 are aligned in the same direction.

In the spectral image measurement apparatus 200, the inlet-side optical system 25 is provided with a diaphragm 27c similar to that mentioned previously. In this case, the diaphragm 27c is also positioned at the focal point of the lens 25a, thereby cutting light rays other than a collimated light ray. Only the collimated light ray is extracted, and incident light having a high wavelength accuracy (wavelength resolution) is guided to the spectral elements 72.

A modification of the spectral image measurement apparatus according to a second embodiment of the invention will now be described.

[Modification 1]

Figure 11:
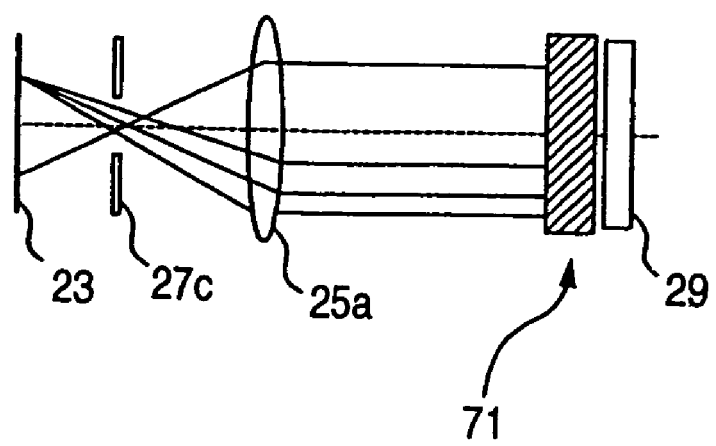
FIG. 11 is a block diagram of a spectral image measurement apparatus according to a modification of the second embodiment.
Figure 12:
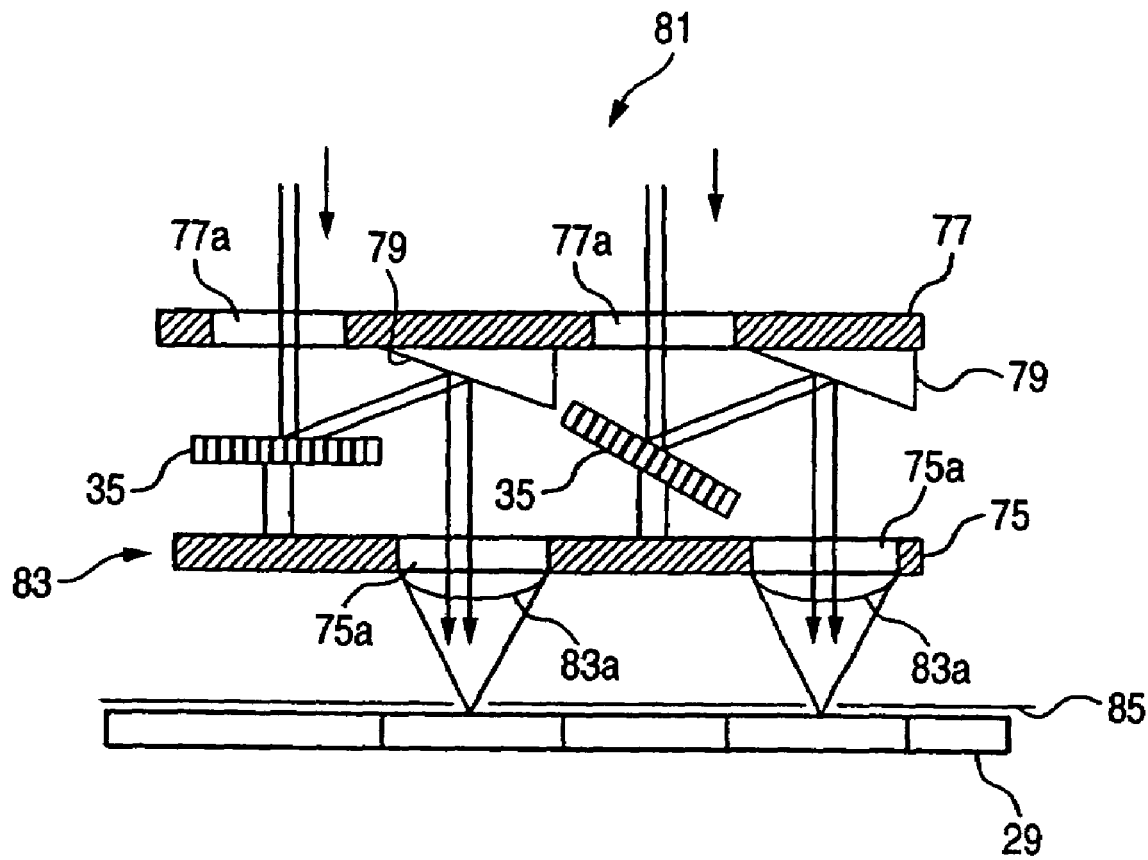
FIG. 12 is an enlarged view of the principal section, showing Modification 1, in which the spectral element array shown in FIG. 10 is additionally provided with a microlens array.

FIG. 11 is a block diagram of a spectral image measurement apparatus according to a modification; and FIG. 12 is an enlarged view of the principal section, showing that the spectral element array shown in FIG. 10 is additionally provided with a microlens array.

A spectral element array 81 of the modification is constituted such that the detection-side optical system 73 includes a microlens array 83 attached ahead of the optical path of the spectral element array 81. Specifically, the substrate 75 is formed as the microlens array 83, wherein the respective openings 75a is provided with microlenses 83a.

The diffracted light gathered by the microlens array 83 is read by the array sensor 29. As a result, the diffracted light of a light intensity selected by the spectral element array 81 in accordance with a wavelength is gathered by the microlens array 83 and detected by the array sensor 29 with high efficiency. In this case, the array sensor 29 is preferably provided with a pinhole array 85. The pinhole array 85 covers the area of the array sensor 29 other than an area where the diffracted light is converged, thereby preventing a decrease in the quality of an image, which would otherwise be caused by stray light.

[Modification 2]

Figure 13:
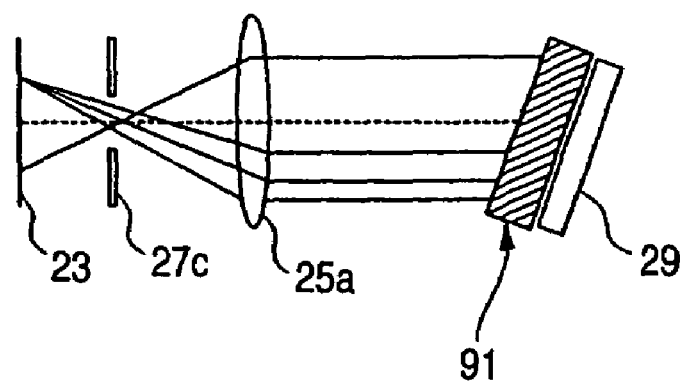
FIG. 13 is a block diagram of a spectral image measurement apparatus according to Modification 2 of the second embodiment.
Figure 14:
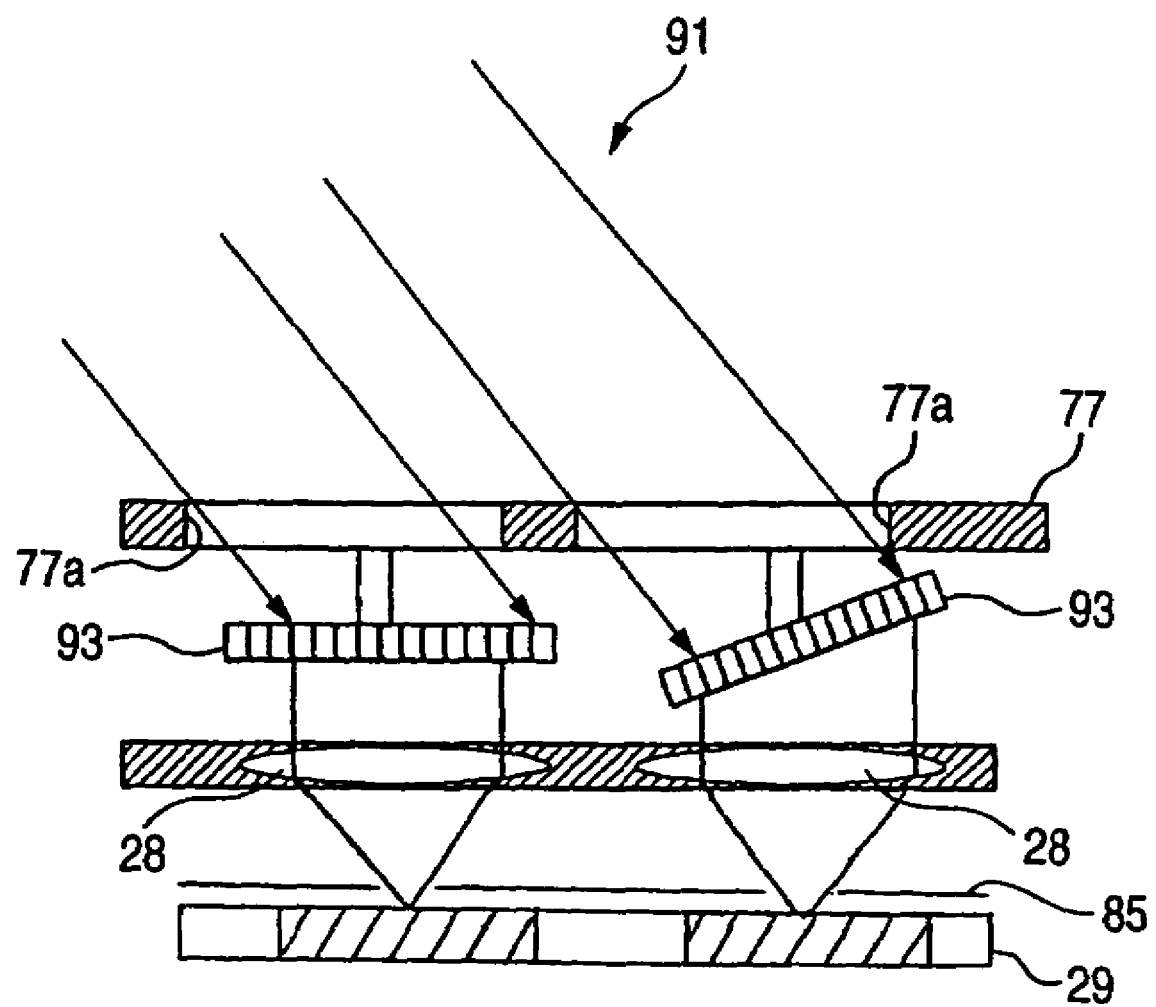
FIG. 14 is an enlarged view of the principal section, showing Modification 2 employing diffraction gratings of Bragg type as the spectral element array shown in FIG. 10.

FIG. 13 is a block diagram of a spectral image measurement apparatus according to the modification, and FIG. 14 is an enlarged view of the principal section, showing Modification 2 employing diffraction gratings of Bragg type as the spectral element array shown in FIG. 10.

As shown in FIG. 13, a spectral element array 91 of the modification is arranged at a predetermined angle with respect to the incident light, and diffraction gratings 93 are of Bragg type. Incident light reflected from the object 23 passes through the diaphragm 27c and the objective lens system 25a and enters the spectral element array 91. As shown in FIG. 14, in the spectral element array 91, the incident light passes through the openings 77a of the aperture member 77, is gathered by a lens 28, and is read by the sensor array 29 by way of the pinhole array 85.

By means of Bragg diffraction arising from the depthwise thickness of a medium, the diffraction gratings (phase gratings) 93 produce diffracted light with high efficiency. Spectra of the diffracted light are unique to molecules of the object 23. Hence, even when the diffracted light is nominal, identification of the substance becomes possible.

According to the spectral element array 91, tilt angles of the respective diffraction gratings 93 corresponding to single pixels are controlled, thereby enabling free changing of a diffracted light wavelength on a per-pixel basis. Further, strong diffracted light is produced by diffraction gratings of transmission type. Hence, a wavelength-variable plane light source can be constituted on a per-pixel basis.

The pieces of spectral image measurement apparatus 100, 200 may employ a spectral element array formed from concave gratings in place of the spectral element arrays of diffraction type 21, 71, 81, and 91. As a result, the configuration including a microlens array can be simplified, and stray light can be kept at a low level.

The spectral image measurement method using the spectral image measurement apparatus will now be described.

Figure 15:
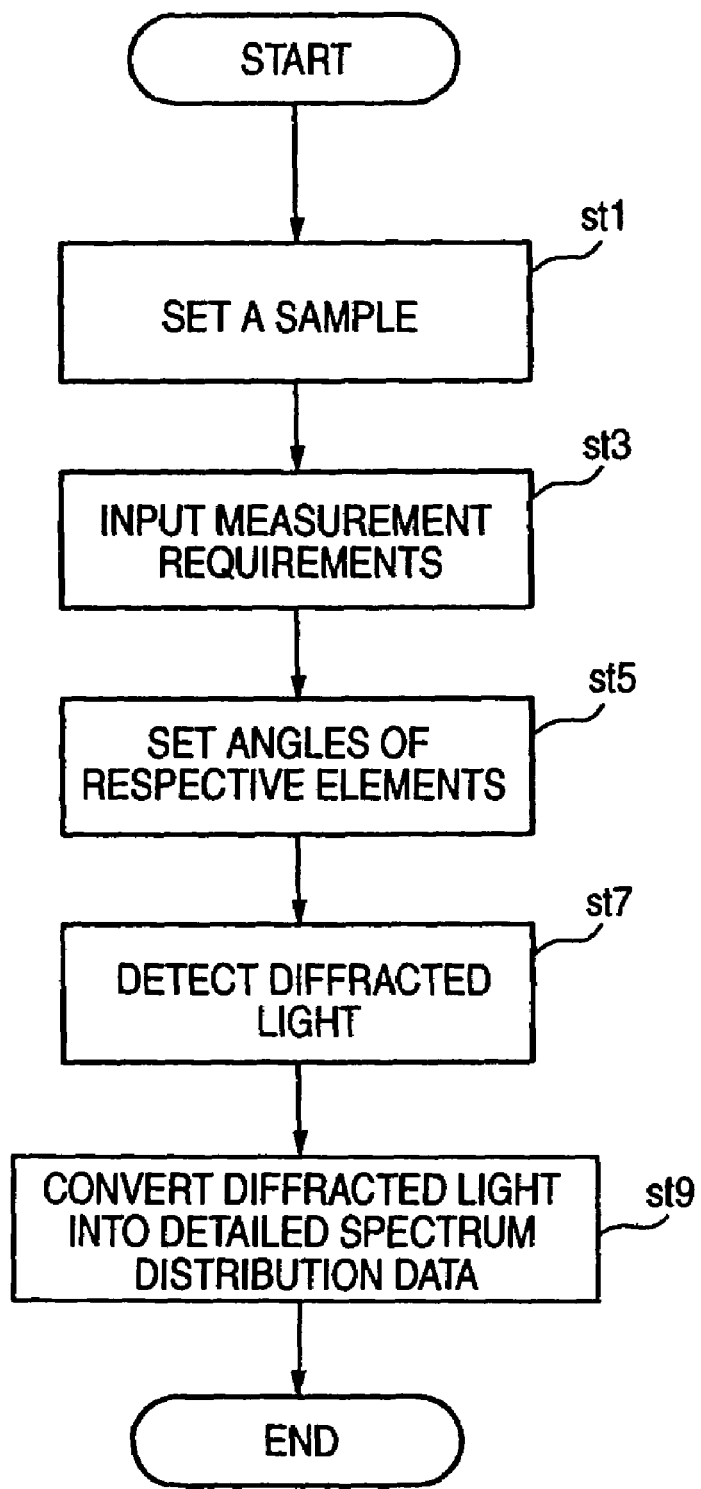
FIG. 15 is a flowchart of procedures for detecting diffracted light rays in a single operation by means of setting the tilt angles to different angles.
Figure 16:
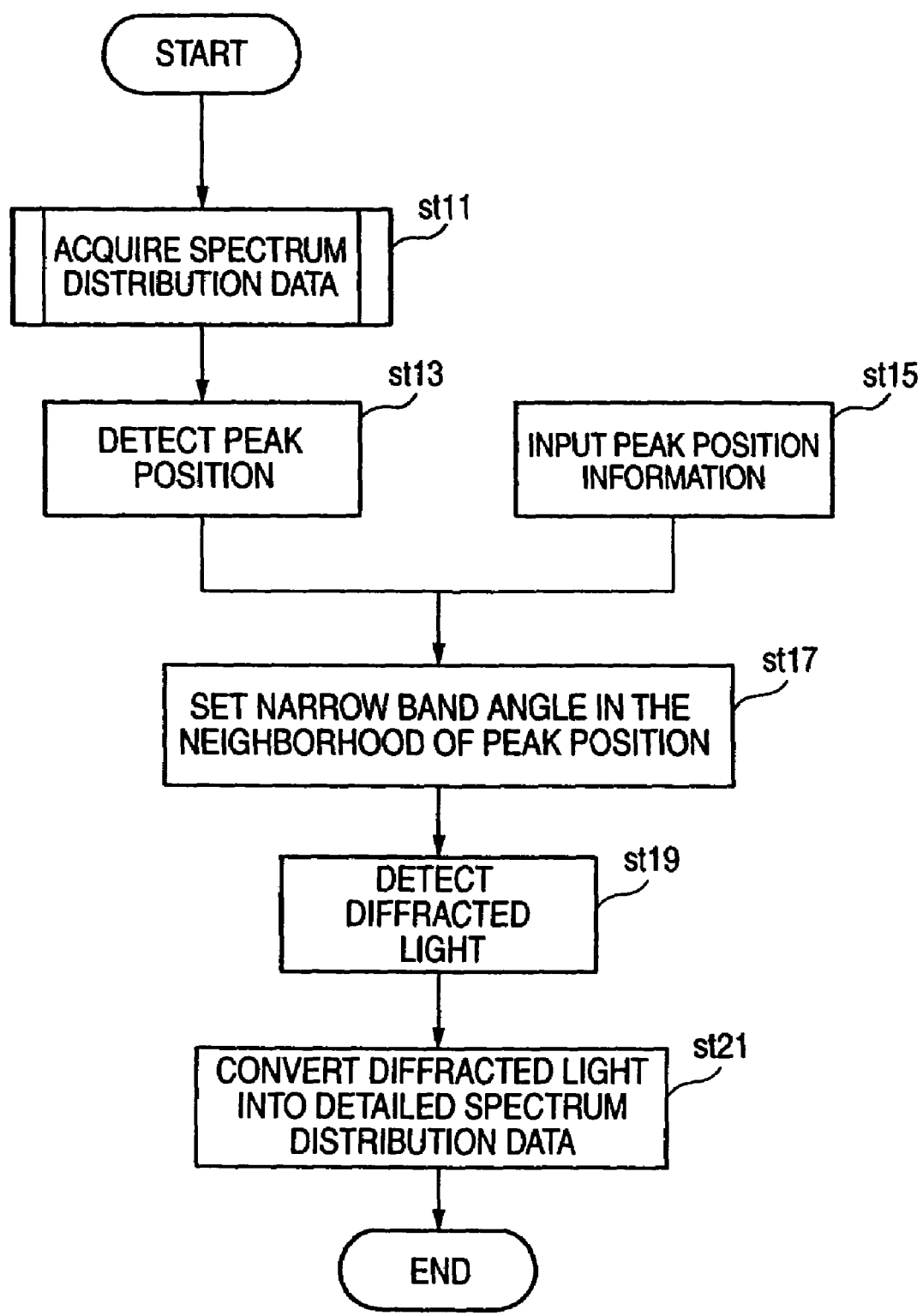
FIG. 16 is a flowchart of procedures for detecting diffracted light of only a wavelength range in the vicinity of a detected peak wavelength.

FIG. 15 is a flowchart of procedures for detecting diffracted light rays in a single operation by means of setting the tilt angle to different angles, and FIG. 16 is a flowchart of procedures for detecting diffracted light of only a wavelength range in the vicinity of a detected peak wavelength.

This spectral image measurement method can be used for both the spectral image measurement apparatus 100 and the spectral image measurement apparatus 200. A case where the spectral image measurement apparatus 100 is used will now be described.

As shown in FIG. 15, the object (sample) 23 is set in the spectral image measurement apparatus 100 (st1).

Next, measurement requirements are input by way of the input operation section 63 (st3).

As a result, the control section 31 operates, and the tilt angles of the diffraction gratings 35 of the respective spectral elements 37 are set (st5).

The diffracted light is then detected by the array sensor 29 (st7) and converted into detailed spectrum distribution data by the spectrum data processing section 61 (st9).

Through the operations described thus far, the tilt angles of the respective spectral elements 37 of the spectral element array 21 are set to different angles in accordance with a desired spectral range, and the intensity of the diffracted light output from the spectral element array 21 is detected by the array sensor 29 in a single operation.

So long as the diffracted light output from the spectral elements 37 of specific tilt angles is obtained, the wavelength of the diffracted light can be determined from the tilt angles of the spectral elements 37, and hence a peak wavelength of the diffracted light intensity distribution is detected instantaneously.

As shown in FIG. 16, after acquisition of the spectrum distribution data (st11), the position of the peak is detected (st13). Alternatively, the peak position may be acquired by means of inputting peak position information by way of the input operation section 63 (st15).

Next, a narrow band angle in the vicinity of the peak position is set (st17).

Diffracted light at the narrow band angle is detected (st19) and converted into detailed spectrum distribution data (st21).

Specifically, according to the spectral image measurement method, the peak of the diffracted light intensity distribution is detected after detection of the intensity of the diffracted light output from the spectral element array 21. The diffraction gratings 35 of the spectral element array 21 are set to tilt angles corresponding to the neighborhood of the detected peak, thereby detecting the intensity of the diffracted light in only the wavelength band close to the peak intensity. Accordingly, the diffraction gratings 35 are set at a narrower tilt angle corresponding to the neighborhood of the detected peak wavelength, thereby detecting the intensity of the diffracted light. As a result, the detailed spectrum distribution of the peak wavelength band is obtained efficiently, and the substance of the object 23 can be identified quickly.

The spectral image measurement method using the spectral image measurement apparatus enables simultaneous measurement of a plurality of different diffracted light rays.

Figure 17:
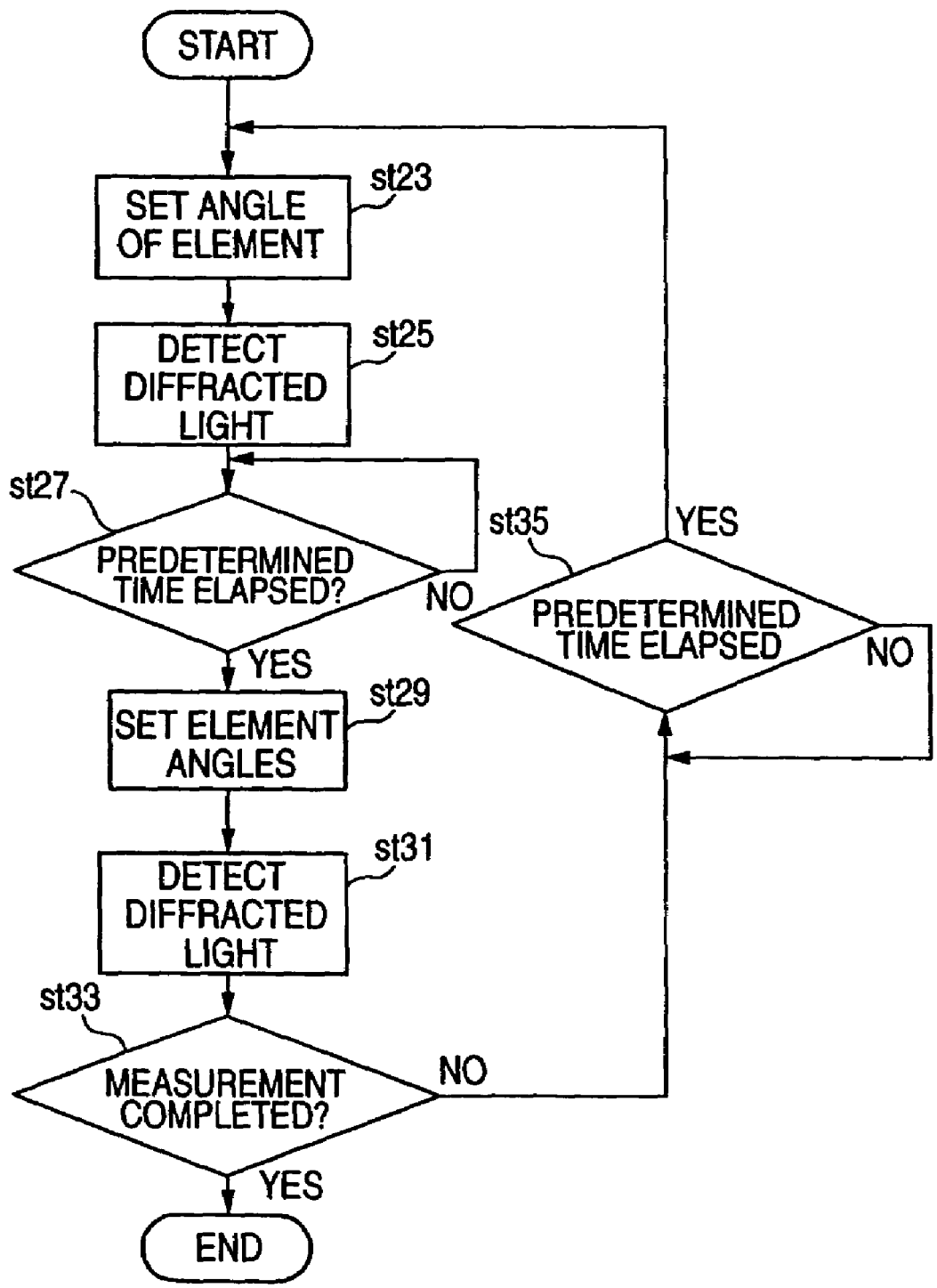
FIG. 17 is a flowchart of procedures for detecting intensity of spectra of specific different wavelength ranges, by means of sequentially, repeatedly setting the tilt angles to tilt angles corresponding to a plurality of different wavelength ranges.

FIG. 17 is a flowchart of procedures for simultaneously detecting intensity of spectra of specific different wavelength ranges, by means of sequentially, repeatedly setting the tilt angle to tilt angles corresponding to a plurality of different wavelength ranges.

According to the spectral image measurement method, a plurality of different element angles are set in the spectral element array 21 (st23), and diffracted light output from the spectral element array 21 is detected (st25).

After lapse of a predetermined time (st27), the tilt angles of the diffraction gratings 35 of the spectral elements 37 are reset to different tilt angles (st29), to thus detect the diffracted light (st31).

These operations are iterated every time a predetermined time lapses (st35) until the end of measurement (st33).

According to this spectral image measurement method, the diffraction gratings 35 of the spectral element array 21 are sequentially, repeatedly set to tilt angles corresponding to a plurality of different wavelength ranges. The intensity of diffracted light is detected at each of the respective tilt angles by means of the array sensor 29, thereby simultaneously detecting spectral intensities of specific, different wavelength ranges.

Accordingly, the spectral intensities of the specific different wavelength ranges are detected simultaneously, whereby measurement, such as pursuit of fast timewise changes in a plurality of different spectral wavelengths (fluorescence), becomes possible.

According to the spectral image measurement method using the spectral image measurement apparatus, all the diffraction gratings 35 of the spectral element array 21 can be set to a specific tilt angle, thereby enabling detection of a spatial intensity distribution of a specific wavelength.

According to such a spectral image measurement method, the diffraction gratings 35 of all the spectral elements 37 are synchronously set to a specific tilt angle. Diffracted light corresponding to the tilt angle is extracted from an arbitrary diffraction grating from among the two-dimensionally-arranged multiple diffraction gratings 35. Thereby, a spatial distribution of a substance identified by the diffracted light can be detected.

According to the spectral image measurement apparatus of the present invention, a plurality of micro-electrically-driven mechanical spectral elements are arranged two-dimensionally. Each of the spectral elements is provided with a diffraction grating which is to tilt to an arbitrary angle upon receipt of an applied electric field, thereby generating spectra from incident light. Hence, a wavelength to be tilted can be controlled by means of tilting the respective diffraction gratings and changing the incident angle. Causing each of the spectral elements to correspond to one pixel enables per-pixel-basis generation of spectra and per-pixel-basis control of a spectral wavelength. Consequently, simultaneous observation of timewise and spatial changes in spectra becomes possible. Moreover, since the spectral element is constituted of a micro-electrically-driven mechanical spectral element, high-speed operation can be realized with a compact, simple structure, and a rapid timewise change can also be detected. As a result, measurement operation, such as pursuit of rapid timewise changes in a plurality of different spectral wavelengths (fluorescence), also becomes feasible.

Further, the spectral image measurement apparatus of the present invention comprises a spectral element drive section for driving the spectral elements; an inlet-side optical system for guiding to the spectral element array light emitted from an object to be detected; a detection-side optical system for forming an image with diffracted light output from the spectral element array; and an array sensor for detecting the diffracted light through the detection-side optical system. Hence, the light reflected from the object to be detected is guided to the spectral element array by means of an inlet-side optical system. Diffracted light—which has been selected by the spectral element array in accordance with a wavelength and has low light intensity—is gathered into an image and then detected by the array sensor. Thereby, timewise and spatial changes in the spectra (wavelength distribution) can be observed in view of spectroscopy.

According to the spectral image measurement method of the present invention, the tilt angles of the respective spectral elements are set to different tilt angles in accordance with a desired spectral range. The intensity of diffracted light output from the spectral element array is detected by the array sensor in a single operation. So long as diffracted light is obtained from the spectral element shaving specific tilt angles, the wavelength of resultant diffracted light is determined from the tilt angles of the spectral elements. The peak wavelength of the diffracted light intensity distribution can be detected instantaneously.

The entire disclosure of each and every foreign patent application from which the benefit of foreign priority has been claimed in the present application is incorporated herein by reference, as if fully set forth.

What is claimed is:

1. A spectral image measurement apparatus comprising:
a spectral element array which includes:
a substrate; and
a plurality of micro-electrically-driven mechanical spectral elements arranged two-dimensionally on the substrate,
wherein each of the spectral elements comprises a diffraction grating having a diffraction surface, the diffraction grating being pivotably supported on the substrate;
wherein each of the spectral elements generates spectra from a light entering the diffraction surface by applying an electric field to the diffraction grating to tilt the diffraction grating with respect to the substrate; and
wherein each of tilt angles of the diffraction gratings with respect to the substrate is capable of being set individually;
a spectral element drive section for driving the spectral elements;
an inlet-side optical system for guiding, to the spectral element array, a light emitted from an object to be detected;
a detection-side optical system for forming an image with a diffracted light output from the spectral element array; and
an array sensor for detecting the diffracted light through the detection-side optical system.

2. The spectral image measurement apparatus according to claim 1,
wherein each of the spectral elements comprises:
a movable electrode that drives the diffraction grating so as to tilt the diffraction grating with respect to the substrate;
at least one fixed electrode having a plurality of electrode layers, wherein said at least one fixed electrode is provided beside the diffraction grating, and each of the plurality of electrode layers is confronted with the movable electrode in accordance with each of the set tilt angles.

3. The spectral image measurement apparatus according to claim 1, wherein the spectral element array further comprises:
an aperture member having at least one opening, wherein each of said at least one opening limits an angle at which an incident light enters the diffraction grating and an angle at which a diffracted light exits the diffraction grating, the aperture member being provided above the diffraction surface of the diffraction grating.

4. The spectral image measurement apparatus according to claim 1, further comprising a diaphragm provided at a focal point of a light path of the detection-side optical system.

5. The spectral image measurement apparatus according to claim 1, wherein the detection-side optical system includes a microlens array mounted ahead of an optical path of the spectral element array.

6. A spectral image measurement method using the spectral image measurement apparatus according to claim 1, the method comprising:
setting the tilt angles of respective spectral elements of the spectral element array to different angles in accordance with a desired spectral range; and
detecting an intensity of the diffracted light output from the spectral element array with the array sensor in a single operation.

7. A spectral image measurement method using the spectral image measurement apparatus according to claim 1, the method comprising:
setting the tilt angles of the diffraction gratings of the spectral element array to a first set of tilt angles that correspond to a first wavelength range, and detecting an intensity of a diffracted light output from the spectral element array, so as to obtain a first spectrum of the intensity of the diffracted light and detect a peak of the first spectrum;
setting the tilt angles of the diffraction gratings of the spectral element array to a second set of tilt angles that correspond to a second wavelength range, wherein the second wavelength range is narrower than the first wavelength range and is a neighborhood of a wavelength of the detected peak of the first spectrum; and
detecting an intensity of a diffracted light in only the second wavelength range.

8. A spectral image measurement method using the spectral image measurement apparatus according to claim 1, the method comprising:
setting the tilt angles of the diffraction gratings of the spectral element array to a first set of tilt angles that corresponds to a first wavelength range;
detecting an intensity of a first diffracted light at one time based on the first set of tilt angles by the array sensor;
setting the tilt angles of the diffraction gratings of the spectral element array to a second set of tilt angles that corresponds to a second wavelength range, the second wavelength range being different from the first wavelength range; and
detecting an intensity of a second diffracted light at one time based on the second set of tilt angles by the array sensor.

9. A spectral image measurement method using the spectral image measurement apparatus according to claim 1, the method comprising:
setting all of the tilt angles of the diffraction gratings of the spectral element array to a specific single tilt angle; and
detecting a spatial intensity distribution corresponding to a specific wavelength.

* * * * *